Figure 1:
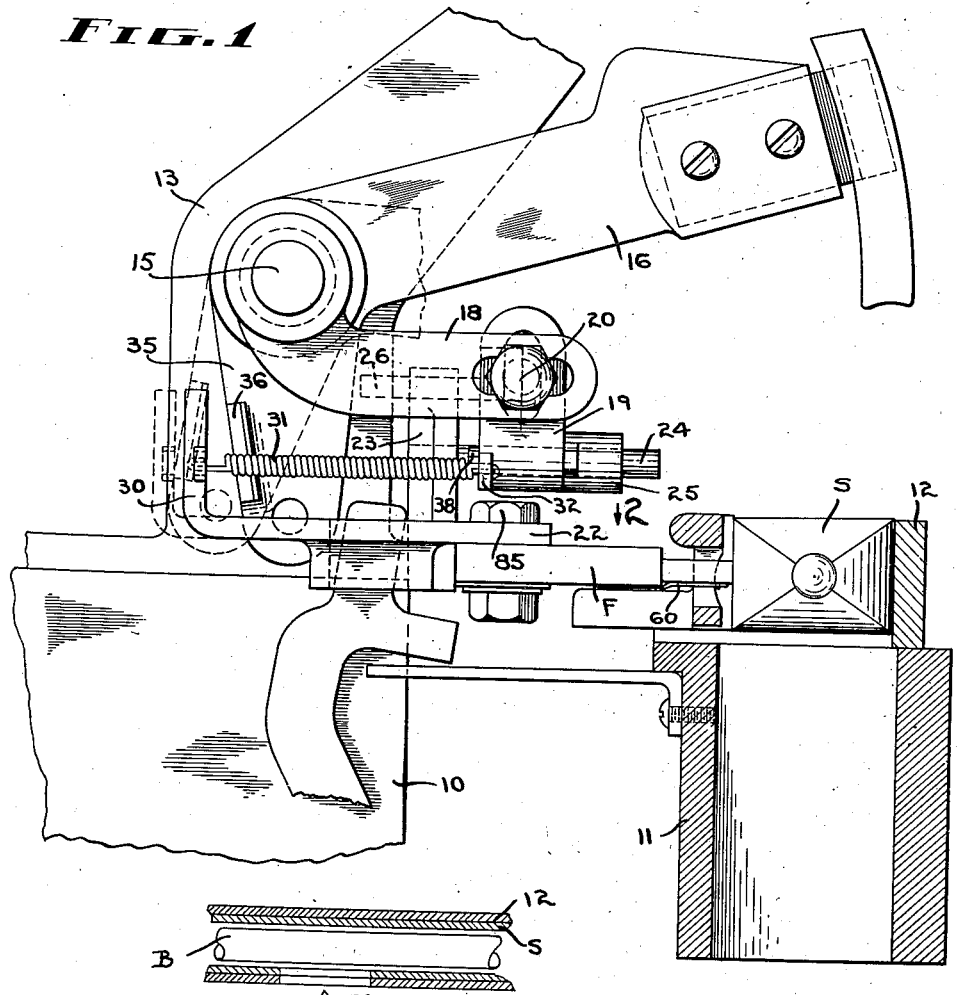

Dec. 8, 1942.    C. R. KRONOFF    2,304,181
ELECTRIC WEFT DETECTOR FOR LOOMS
Filed Dec. 15, 1941    2 Sheets-Sheet 1

INVENTOR
CLARENCE R. KRONOFF
Chas. P. Hawley
ATTORNEY

Dec. 8, 1942.  C. R. KRONOFF  2,304,181
ELECTRIC WEFT DETECTOR FOR LOOMS
Filed Dec. 15, 1941  2 Sheets-Sheet 2
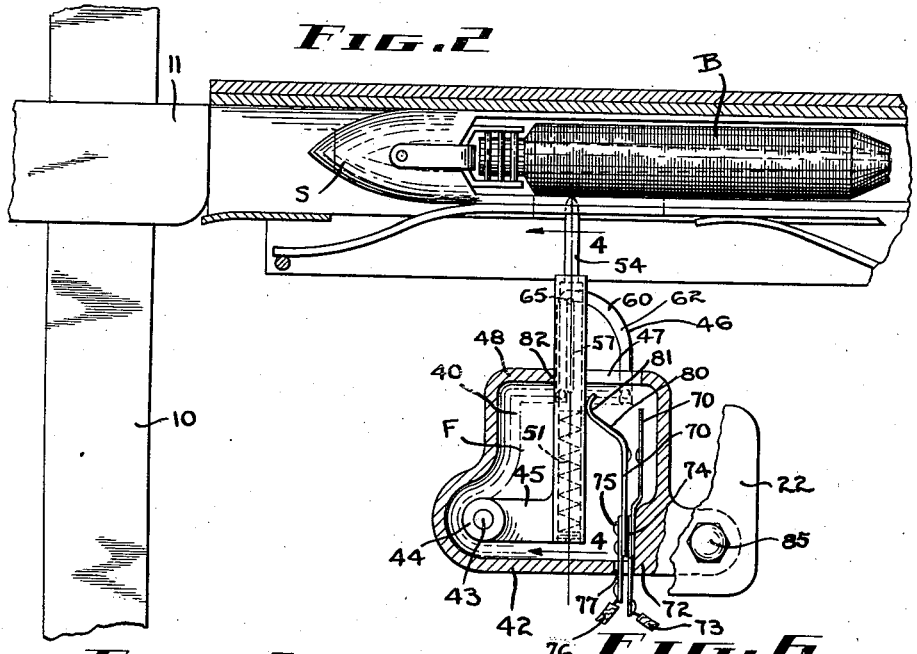
INVENTOR
CLARENCE R. KRONOFF
Chas. T. Hawley
ATTORNEY Patented Dec. 8, 1942

2,304,181

UNITED STATES PATENT OFFICE 2,304,181

ELECTRIC WEFT DETECTOR FOR LOOMS

Clarence R. Kronoff, Worcester, Mass., assignor to Crompton & Knowles Loom Works, Worcester, Mass., a corporation of Massachusetts Application December 15, 1941, Serial No. 423,008

14 Claims. (Cl. 139—273)

This invention relates to electrical weft detectors for looms and it is the general object of the invention to provide such a detector which shall be certain in its operation while at the same time be usable on delicate yarns.

When weft detectors are applied to the magazine end of weft replenishing looms it is necessary to move the detector out of the path of the incoming bobbin at the time of transfer in order to prevent breakage. This result is generally accomplished by a connection with the transferrer arm which acts on some part of the detector mechanism during the transferring operation. After the transfer is completed and the transferrer arm returns to normal position the detector moves rearwardly to its normal detecting position. When weft detectors of the side slipping type are used there is a tendency for the detector arm to swing laterally on its return motion and thus give a false indication. It is an important object of my present invention to provide means for holding the detector in correct position when it is under control of the transferrer arm for the purpose of preventing improper indication of weft exhaustion.

Side slipping weft detectors are either offset from their pivots or extend rearwardly in a direction oblique to the axis around which they turn during indication of weft exhaustion while engaging an exhausted supply of weft. As a result of this construction the greater part of the weight of the detector is located on one side of the detector axis and the detector tends by reason of its inertia to move angularly when its support is moving. When a detector lies for instance to the right of its pivot it will swing in a right hand direction to give indication of exhaustion. During forward motion of the detector incident to a transfer operation of the loom the inertia of the detector tends to make the latter move to the left with respect to the support, or in a direction opposite to that which it must move to give indication and at this time there is little likelihood that a false indication will be given. On the return rearward motion, however, the inertia of the detector tends to turn it to the right, or in the direction in which the detector moves to give indication. It is another object of my present invention to provide means which will restrain the inertia force and prevent improper lateral motion of the detector during its rearward motion subsequent to a transferring operation.

It is a further object of my present invention to provide a detector having a guard or the like which serves as a yielding lock sufficiently strong to prevent accidental movement in the indicating direction when the detector is out of engagement with the yarn but not strong enough to interfere with an indicating operation of the detector when the latter is moved forwardly by the bobbin being detected. It is to be understood that the undesired false indication to which I have referred occurs when the detector is out of contact with the bobbin and it is for this reason that a guard or lock insufficient to prevent an indicating movement by the bobbin can be used to prevent false sliding movement of the detector due to its inertia.

Certain forms of electrical weft detectors employ a side slipping arm which upon lateral indicating movement closes a circuit. Springs are generally employed to return the detector arm to its normal detecting position after an indication. It is another object of my present invention to eliminate these springs and employ an extension of one of the resilient contact members for the purpose of returning the detector to normal position. I do not wish to be limited to an electrical weft detector of this type, however, inasmuch as certain features of my invention operate independently of the particular means employed to return the detector to detecting position after an indicating movement thereof.

With these and other objects in view which will appear as the description proceeds, my invention resides in the combination and arrangement of parts hereinafter described and set forth.

Figure 7:
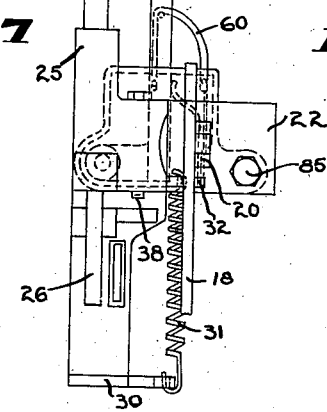
Figure 8:
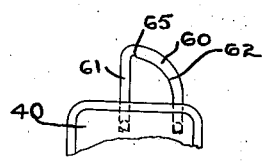

In the accompanying drawings, wherein a convenient embodiment of my invention is set forth, Fig. 1 is a side elevation of a weft detector made according to my present invention showing adjacent parts of the loom, Fig. 2 is a plan view of part of the structure shown in Fig. 1, parts being in section, showing the preferred form of detector in engagement with a full supply of weft in the shuttle, Fig. 3 is a view similar to a portion of Fig. 2, but showing the detector in engagement with an exhausted supply of weft and moved to indicating position, Fig. 4 is a vertical detailed section on line 4—4 of Fig. 2, Fig. 5 is a vertical detailed section on line 5—5 of Fig. 3, Fig. 6 is a view similar to a portion of Fig. 2, but showing a modified form of weft detector, Fig. 7 is a diagrammatic view showing the detector in the extreme forward position to which it is moved at the time of the transferring operation of the loom immediately before it starts to move rearwardly toward its normal position, and Fig. 8 is a detail plan view of a portion of Fig. 7 showing the detector carrier tube removed to illustrate the guard and lock for the carrier.

Referring to the drawings, I have shown a loom frame 10, a lay 11, shuttle box 12, shuttle S and magazine frame 13 all of common construction. The magazine frame 13 has secured thereto a relatively large stud 15 on which is mounted a transferrer arm 16 movable angularly around the stud 15 at the time of the transferring operation by mechanism well understood but not shown herein. Secured in fixed position on the stud 15 is a rearwardly extending arm 18 on which is mounted a guide stand 19 held in fixed adjusted position by a bolt 20 which passes through the arm 18 and the guide stand.

A sliding detector support 22 has an upstanding arm 23 to a portion of which is secured a rearwardly extending guide rod 24 passing through a hub 25 on the lower part of stand 19. The upper part of the stand 19 is provided with a forwardly extending guide rod 26 which passes through and has sliding engagement with the upper part of arm 23. The forward end of the slide 22 is upturned as at 30 and is connected with the forward end of a tension spring 31 the rear end of which is connected as at 32 to the stationary guide stand 19 for the purpose of holding the slide 23 yieldingly in normal rear position. The transferrer arm has a depending finger 35 formed with a laterally extending lug 36 which projects behind the upward extension 30.

When the loom has a replenishing operation the transferrer arm moves downwardly from the full to the dotted line position suggested in Fig. 1 and in this motion the lug 36 engages the extension 30 and causes the slide 22 to move forwardly. During this forward motion the rod 24 slides to the left with respect to the hub 25 as viewed in Fig. 1, while the upper end of the arm 23 slides in the same direction with respect to the fixed guide rod 26. After transfer is complete the transferrer arm moves upwardly toward the full line normal position shown in Fig. 1 and spring 31, which was previously stretched as the slide 22 moved forwardly, acts to return slide 22 to its normal rearward position. A stop 38 limits rearward motion of the slide 22 and holds the latter in detecting position when the transferrer arm is fully raised.

The detector, designated generally at F, is bolted to the under side of the slide 22 and comprises a casing 40 made preferably of insulating material such as fibre and having a base 41 and side walls 42. A pivot pin 43 secured to the base receives the hub 44 of a detector arm 45 which extends laterally and to the right of the stud 44 as shown in Fig. 2. Secured to the arm 45 is a rearwardly extending tube 46 preferably rectangular in cross section and having the rear end thereof projected through a slot 47 in the rear wall 48 of the detector body.

As shown in Fig. 4 the tube 46 has the forward end thereof closed by a screw 50 which receives the forward thrust of a light compression spring 51 the rear end of which engages the guiding shank 52 of a detector finger designated generally at D. The rear end of the shank is reduced as at 53 to form a bobbin engaging finger 54 which may be wedge shaped on its end as suggested in Figs. 2 and 3. The rear end of the tube 46 is partly closed as at 55 to engage the rear part of shank 52 and limit rearward motion of the latter under action of the spring 51. A slot 57 in the bottom of the tube 46 has extending therethrough a pin 58 which is secured to the shank 52.

A guard or lock 60 secured to the casing floor 41 extends rearwardly and may have a straight section 61 at the left thereof as viewed in Fig. 3 and a curved part having an internal curved surface 62. The latter surface is preferably eccentric with respect to the hub 44 and is positioned for engagement with the pin 58. The rear part of the surface 62 has formed therein a shallow notch 65 which extends rearwardly and toward the rear end of the detector finger 54.

The electrical means for communicating indication of exhaustion by the detector comprises two resilient flat electric contacts 70 and 71, respectively. The contact 70 extends along an enlargement 72 of the wall 42 of the casing and extends forwardly to be connected to an electric wire 73. The contact 71 is insulated from the contact 70 by a block 74 of appropriate insulating material such as fiber and is held to the enlargement 72 by screws 75. The forward part of contact 71 is connected to electric wire 76, and the forward extensions of both the contact members 70 and 71 may pass through a slot 77 in the front part of the wall 42.

In the preferred form shown more particularly in Figs. 2 and 3 the rear part of contact 71 is bent to the left as at 80 to engage the tube 46 as at 81 when the detector is in detecting position. The extension 80 holds the tube 46 against a stop 82 formed as part of the wall 42 and thus cooperates with the latter to maintain the detector yieldingly in normal detecting position with the finger 54 offset with respect to the stud 44 and the axis of tube 46 substantially perpendicular to the bobbin being detected. In order that the detector may be supported on the slide 22 a bolt 85 passes through the enlargement 72 and the slide 22 to cause the slide and detector to move backwardly and forwardly as a unit.

Under normal conditions the detector is in the position shown in Fig. 2 with the tube 46 held against the stop 82 and the spring contacts 70 and 71 out of engagement with each other, hence wires 73 and 76 unconnected electrically. Under these conditions the pin 58 is seated in the notch 65. As the bobbin B advances with the shuttle due to forward motion of the lay 11 the finger 54 is struck by the yarn and is held against lateral movement thereby. As the lay continues to advance the shank 52 slides within the tube 46 against the action of the spring 51 and the pin 58 moves out of notch 65. Swinging movement of the detector arm 45 is prevented by the presence of weft sufficiency as the lay continues to advance and the contacts 70 and 71 are kept out of engagement with each other.

When the weft is substantially exhausted, however, as indicated in Fig. 3, the bobbin strikes the finger 54 and moves the latter forwardly enough to move the finger 58 out of notch 65, after which the detector finger slides along the bare bobbin and causes contact 71 to move into engagement with contact 70, thereby electrically connecting the wires 73 and 76. This condition is that needed to bring about a change in loom operation, such as replenishment or stoppage, and it is not thought necessary to illustrate the electro-magnetically operated or controlled means by which these results were accomplished. As the lay recedes extension 80 of contact 71, aided temporarily by the resilience of contact 70, starts to move the tube 46 to the left as viewed in Fig. 3 until the detector has been returned to its normal position as shown in Fig. 2. During this return motion the pin 58 slides along the surface 62, and the latter, being shaped as already described, cooperates with the spring 51 to move the tube 46 to the left. As the detector approaches its normal position contacts 70 and 71 separate but the latter continues to move the tube 46 to the left.

In the type of looms to which my invention more particularly relates, such for instance as that shown in prior Patent No. 1,030,748, replenishment occurs on a pick subsequent to that on which indication of exhaustion is given by the detector and upon the subsequent arrival of shuttle S on a later pick of the loom the transferrer arm 16 will descend as already described and will move the detector and associated parts forwardly to the position indicated diagrammatically in Fig. 7. In this position it will be seen that the finger 54 is out of contact with the bobbin B, the pin 58 is in notch 65, and the greater part of the weight of the detector is at the right of pivot 44. As the transferrer arm rises the base 40 moves rearwardly under the action of spring 31, but the inertia of the detector tends to move the latter to the right due to its offset relationship with respect to the stud 44. At this time, however, pin 58 is held in notch 65 by spring 51 and these parts resist the tendency of the detector to move angularly as the base 40 moves rearwardly. The detector is therefore returned to its normal rearward position with the detector preserving its normal relation with respect to the base 40 and with no likelihood that the contacts 70 and 71 will engage each other.

While I have described the contact 71 as the agent by which the detector is returned to normal position, I may if desired use the modified construction as shown in Fig. 6 wherein a light tension spring 90 is interposed between a fixed part 91 of the casing 40 and a part 92 of an arm 93 which in all other respects is similar to arm 45. When the spring 90 is employed the contact 71 is not relied upon fully to return the detector to normal position after an indicating movement.

From the foregoing it will be seen that I have provided means for preventing the detector from giving false indication when returning from forward to normal rearward position subsequent to a replenishing operation of the loom. It will be seen that this result is accomplished by the pin 58 which occupies the notch 65 due to the fact that the detector finger 54 at this time is not in engagement with the bobbin. While I have described the notch 65 I do not wish necessarily to be limited to its use inasmuch as the rear left part of the curved surface 62 at that point where it meets the corresponding adjacent face of the section 61 may suffice to hold the detector in normal position. It will also be seen that the contact 71 in the preferred form of the invention serves not only to close the loom controlling contact but also acts to return the detector to normal position subsequent to an indicating swinging movement thereof.

Having thus described my invention it will be seen that changes and modifications may be made therein by those skilled in the art without departing from the spirit and scope of the invention and I do not wish to be limited to the details herein disclosed, but what I claim is:

1. In weft detecting mechanism for a weft replenishing loom, a detector carrier which moves away from the surface being detected incident to a replenishing operation of the loom and thereafter has a return movement toward the surface being detected, a side slipping weft detector pivoted to the carrier and having a lateral motion in a given direction to effect indication of weft exhaustion and tending by the inertia thereof to move laterally in said given direction when the carrier has said return movement, and means to prevent lateral motion of the weft detector in said direction when the carrier has said return movement toward the surface to be detected.

2. In weft detecting mechanism for a weft replenishing loom, a detector carrier which moves forwardly away from the surface being detected incident to a replenishing operation of the loom and thereafter has a rearward return movement toward the surface being detected, a side slipping weft detector mounted on the carrier for lateral movement relatively thereto in a given direction when indicating weft exhaustion and tending by the inertia thereof to move laterally in said given direction when the carrier has said return movement, and means to prevent lateral movement of the detector in said given direction when the carrier has said return movement.

3. In weft detecting mechanism for a weft replenishing loom, a detector carrier which moves forwardly away from the surface being detected incident to a replenishing operation of the loom and thereafter has a rearward return movement toward the surface being detected, a side slipping weft detector, a pivotal connection between the detector and the carrier, said detector having the greater part of the weight thereof located on one side of the pivotal connection and the detector when indicating weft exhaustion having a lateral motion, the detector by reason of the inertia thereof tending to have said lateral movement when the carrier has said return movement, and means to prevent lateral movement of the detector when the carrier has said return movement.

4. In weft detecting mechanism for a weft replenishing loom, a detector carrier which moves away from the surface being detected incident to a replenishing operation of the loom and thereafter has a return movement toward the surface being detected, a side slipping weft detector pivoted to the carrier and tending by reason of the inertia thereof to have a side slipping motion in a direction to give indication of weft exhaustion during said return movement of the carrier, and means to prevent side slipping movement of the detector during said return movement of the carrier.

5. In weft detecting mechanism for a weft replenishing loom, a detector carrier which moves away from the surface being detected incident to a replenishing operation of the loom and thereafter has a return movement toward the surface being detected, a detector support pivoted to the carrier and having a side slipping movement in a given direction when the detector indicates weft exhaustion and tending by the inertia thereof to move laterally in said given direction when the carrier has said return movement, a detector finger movably mounted on the support and held normally in rear detecting position, and means including an element movable with the finger to prevent side slipping movement of the support in said direction during said return movement of the carrier.

6. In weft detecting mechanism for a weft replenishing loom, a detector carrier which moves away from the surface being detected incident to a replenishing operation of the loom and thereafter has a return movement toward the surface being detected, a detector support pivotally mounted on the carrier and having a side slipping movement in a given direction when the detector indicates weft exhaustion and tending by the inertia thereof to move laterally in said given direction when the carrier has said return movement, a detector finger mounted on and movable with respect to the support, and cooperating parts on the finger and carrier to prevent side slipping movement of the support in said direction during said return movement of the carrier.

7. In an electrically indicating weft detector, a detector carrier having a forward movement incidental to a replenishing operation of the loom followed by a return backward movement, normally open electric contacts to be closed to give indication of weft exhaustion, a detector support pivotally mounted on the carrier and having a lateral movement toward said contacts to close said contacts when indicating weft exhaustion and tending by the inertia thereof to move toward said contacts when the carrier has said return movement, and means to prevent lateral movement of the support toward said contacts during said return rear movement of the carrier.

8. In an electrically indicating weft detector, a detector carrier having a forward movement incidental to a replenishing operation of the loom followed by a return backward movement, normally open electric contacts to be closed to give indication of weft exhaustion, a detector support pivoted to the carrier, a feeler tip mounted on the support, said support and tip having a lateral movement toward said contacts to close said contact when indicating weft exhaustion and tending by the inertia thereof to move toward said contacts when the carrier has said return movement, and means including a part carried by the tip to prevent lateral movement of the support toward said contacts and tip during said return movement of the carrier.

9. In a side slipping weft detector having a support, an arm pivoted on the support and extending laterally therefrom in the direction of the length of the surface to be detected, a rearwardly extending tube secured to the arm having a rectangular internal cross section, a detector finger supported by the tube and having a tip projection beyond the tube and having a bearing body slidable within the tube and of a cross section conforming substantially to the interior of the tube, a spring within the tube in front of said body to exert a rearward yielding force tending to hold the tip in normal detecting position, means on the tube to limit rearward motion of the feeler, means on the front part of the tube to engage the front end of the spring to hold the latter normally compressed, and yielding means tending normally to hold the tube and finger in normal detecting position and yieldable when the tip slides along the surface to be detected.

10. In a side slipping weft detector for a loom having a fixed support and operating with a longitudinally extending surface to be detected, a pivot fixed with respect to said support, a carrier pivoted on said pivot and including an arm extending laterally from the pivot connected to a rearwardly extending tube of non-circular internal transverse cross section, a feeler element having a tip projecting rearwardly beyond the tube for engagement with the surface to be detected, said feeler element having a sliding body located within the tube and having a cross section conforming substantially to the internal cross section of the tube, a spring within the tube in front of said body, a plug in the front end of the tube to engage the front end of the spring and cause the latter to exert a forwardly yieldable rearwardly directed force on said element, yielding means engaging the tube and tending to hold the latter and element in normal detecting position, the detector when engaging a sufficient supply of weft on the surface to be detected sliding forwardly relatively to the tube and the latter remaining substantially at rest with respect to said pivot, the tip when sliding along the said surface at the time of weft exhaustion being held in rearward position relatively to the tube by said spring and causing said tube to move angularly about the pivot, and means to limit rearward movement of the sliding body with respect to the tube.

11. In a side slipping weft detector for a loom having a longitudinally extending surface to be detected and provided with a fixed support in front of said surface, a pivot fixed with respect to said support, a carrier comprising an arm rotatably mounted on said pivot and extending laterally therefrom in the direction of the length of the surface to be detected and including also a rearwardly extending tubular member secured to the arm, a detector element having a body located in and slidable with respect to the tube and having a tip projecting beyond the tube to engage said surface to be detected, a spring in said tubular member in front of said body, means fixed with respect to the front end of the tubular member to engage said spring and cause the latter to exert a rearward but forwardly yieldable force on the element tending to hold the tip normally in detecting position, means to limit rearward motion of the tip with respect to the tubular member, and spring means tending to hold the tip and tubular member in normal detecting position, said tip when engaging a sufficient supply of weft on said surface sliding forwardly relatively to the carrier and the latter remaining substantially at rest with respect to said pivot, said tip when engaging a substantially exhausted surface sliding therealong and causing angular movement of the carrier around said pivot.

12. In weft detecting mechanism for a weft replenishing loom, a detector carrier which moves forwardly away from the surface being detected incident to a replenishing operation of the loom and thereafter has a rearward return movement toward the surface being detected, a side slipping weft detector member pivoted to the carrier and movable laterally in a given direction to indicate weft exhaustion, a feeler tip slidably mounted on the member for movement relatively to the latter in a direction toward and from the surface being detected, resilient means to hold the tip in normal rear position with respect to the member but permitting the tip to move forwardly with respect to the member and carrier, a guard secured to the carrier and moving therewith and having a notch therein, and a pin on the tip normally held in the notch by said resilient means, the member being located at one side of the axis thereof and tending by the inertia thereof to move in said given direction when the carrier has said return movement, said pin and notch being held in cooperating relation by said resilient means to prevent movement of the member and tip in said direction during said return movement of the carrier, engagement of the surface being detected with the tip moving the pin out of the notch to permit said member to be moved in said direction by a force transmitted from the surface being detected through said tip.

13. In weft detecting mechanism for a weft replenishing loom, a detector carrier which moves forwardly away from the surface being detected incident to a replenishing operation of the loom and thereafter has a rearward return movement toward the surface being detected, a side slipping weft detector member pivoted to the carrier and movable laterally in a given direction to indicate weft exhaustion, a feeler tip slidably mounted on the member for movement relatively to the latter in a direction toward and from the surface being detected, resilient means to hold the tip in normal rear position with respect to the member but permitting the tip to move forwardly with respect to the member and carrier, and two cooperating parts one of which is mounted on and moves with the carrier and the other of which moves with the tip, said resilient means holding said parts in cooperative relation to prevent movement of the member and tip in said direction due to the inertia thereof during said return movement of the carrier, said parts becoming disengaged during a normal detecting operation.

14. In weft detecting mechanism for a weft replenishing loom, a detector carrier which moves forwardly on replenishing operations of the loom and has a return movement subsequent to the replenishing operation, a pivot on said carrier, a detector member mounted on and movable about said pivot and having the greater part thereof on one side of the pivot and tending by the inertia thereof to swing in a direction to indicate weft exhaustion during said return movement of the carrier, a detector tip movably mounted on the member to engage the surface to be detected, resilient means normally holding the tip in detecting position relatively to the member, and two cooperating parts held in cooperative relation by the resilient means when said carrier has said return movement incident to a replenishing operation of the loom, one of said parts being on the carrier and the other being on the tip, said parts preventing movement of the member and tip in a direction to indicate weft exhaustion during said return movement of the carrier.

CLARENCE R. KRONOFF.